US011738801B2

(12) United States Patent
Wesenberg et al.

(10) Patent No.: US 11,738,801 B2
(45) Date of Patent: Aug. 29, 2023

(54) METHOD FOR STEERING A MOTOR VEHICLE

(71) Applicant: AUDI AG, Ingolstadt (DE)

(72) Inventors: André Wesenberg, Pfaffenhofen (DE); Sebastian Loos, Ingolstadt (DE); Thorsten Groh, Neuburg an der Donau (DE)

(73) Assignee: AUDI AG, Ingolstadt (DE)

( * ) Notice: Subject to any disclaimer, the term of this patent is extended or adjusted under 35 U.S.C. 154(b) by 63 days.

(21) Appl. No.: 16/972,697

(22) PCT Filed: Jun. 6, 2019

(86) PCT No.: PCT/EP2019/064836
§ 371 (c)(1),
(2) Date: Dec. 7, 2020

(87) PCT Pub. No.: WO2020/007564
PCT Pub. Date: Jan. 9, 2020

(65) Prior Publication Data
US 2021/0253163 A1    Aug. 19, 2021

(30) Foreign Application Priority Data
Jul. 3, 2018    (DE) ...................... 10 2018 210 916.8

(51) Int. Cl.
B62D 6/00    (2006.01)
B62D 5/00    (2006.01)
(52) U.S. Cl.
CPC ............. *B62D 6/008* (2013.01); *B62D 5/005* (2013.01)
(58) Field of Classification Search
CPC .......... B62D 6/008; B62D 6/002; B62D 6/00; B62D 6/003; B62D 6/006; B62D 6/005;
(Continued)

(56) References Cited

U.S. PATENT DOCUMENTS 6,095,277 A    8/2000  Bohner et al.
6,540,044 B1   4/2003  Böhringer et al.
(Continued)

FOREIGN PATENT DOCUMENTS

CN    102015415 A    4/2011
CN    102574540 A    7/2012
(Continued)

OTHER PUBLICATIONS

Notification of Transmittal of Translation of the International Preliminary Report on Patentability dated Jan. 14, 2021, in connection with corresponding International Application No. PCT/EP2019/064836; 8 pages.
(Continued)

*Primary Examiner* — Adam R Mott
*Assistant Examiner* — Erick T. Detweiler
(74) *Attorney, Agent, or Firm* — Maier & Maier, PLLC

(57) ABSTRACT

A method for steering a motor vehicle by a steering mechanism. The steering mechanism has an actuating element, a manual actuator, a steering actuator, at least one transmission component, and a steering feel function. The steering actuator is connected to at least one steerable wheel of the motor vehicle via the at least one transmission component. The actuating element and the manual actuator are mechanically connected to each other. Operating values of a total transmission force acting on the at least one transmission component are transmitted to the steering feel function, which is used to determine input values of a manual force for the manual actuator from the determined operating values for the entire transmission force. The input values are transmitted to a system function for limiting the input values and compared to a predefined maximum value and a predefined minimum value for the actuating force by the system function.

7 Claims, 1 Drawing Sheet

(58) Field of Classification Search
CPC ........ B62D 5/00; B62D 24/02; B62D 5/0463; B62D 5/0472; B62D 7/18; B62D 5/001; B62D 65/04; B62D 15/025; B62D 5/04; B62D 5/046; B62D 5/005; G01C 21/00; G01C 21/04; G01C 21/166; G01C 21/20; B60W 10/00; B60W 30/02; B60W 30/025; B60W 30/04; B60W 2030/041; B60W 2030/043; B60W 30/0953; B60W 30/0956; B60W 30/10; B60W 30/12; B60W 30/165; B60W 30/18163; B60W 30/18172; B60W 60/00; B60W 60/001; B60W 60/0013; B60W 60/0015; B60W 60/0016; B60W 60/0018; B60W 60/00182; B60W 30/00; B60G 2800/963; B60T 2260/02

See application file for complete search history.

(56) References Cited

U.S. PATENT DOCUMENTS

| | | | | |
|---|---|---|---|---|
| 2012/0191301 | A1* | 7/2012 | Benyo | B62D 5/0463 701/41 |
| 2019/0233000 | A1* | 8/2019 | Matsuda | B62D 5/006 |
| 2019/0359252 | A1* | 11/2019 | Yu | B62D 15/022 |
| 2019/0367083 | A1* | 12/2019 | Kodera | B62D 6/04 |

FOREIGN PATENT DOCUMENTS

| | | |
|---|---|---|
| DE | 199 29 427 A1 | 12/2000 |
| DE | 101 07 279 A1 | 8/2002 |
| DE | 603 12 614 T2 | 7/2007 |
| DE | 10 2009 048 092 A1 | 4/2011 |
| DE | 10 2011 106 276 A1 | 1/2013 |
| DE | 102016 014 294 A1 | 6/2018 |

OTHER PUBLICATIONS

Examination Report dated Jul. 25, 2019 in corresponding German application No. 10 2018 210 916.8; 16 pages including Machine-generated English-language translation.

International Search Report dated Sep. 18, 2019 in corresponding International application No. PCT/EP2019/064836; 6 pages.

Written Opinion of the International Searching Authority dated Sep. 18, 2019 in corresponding International application No. PCT/EP2019/064836; 16 pages including Machine-generated English-language translation.

Office Action dated Jun. 7, 2022, in connection with corresponding Chinese Application No. 201980044897.9 (15 pp., including machine-generated English translation).

Office Action dated Sep. 21, 2022, in connection with corresponding Chinese Application No. 201980044897.9 (11 pp., including machine-generated English translation).

* cited by examiner

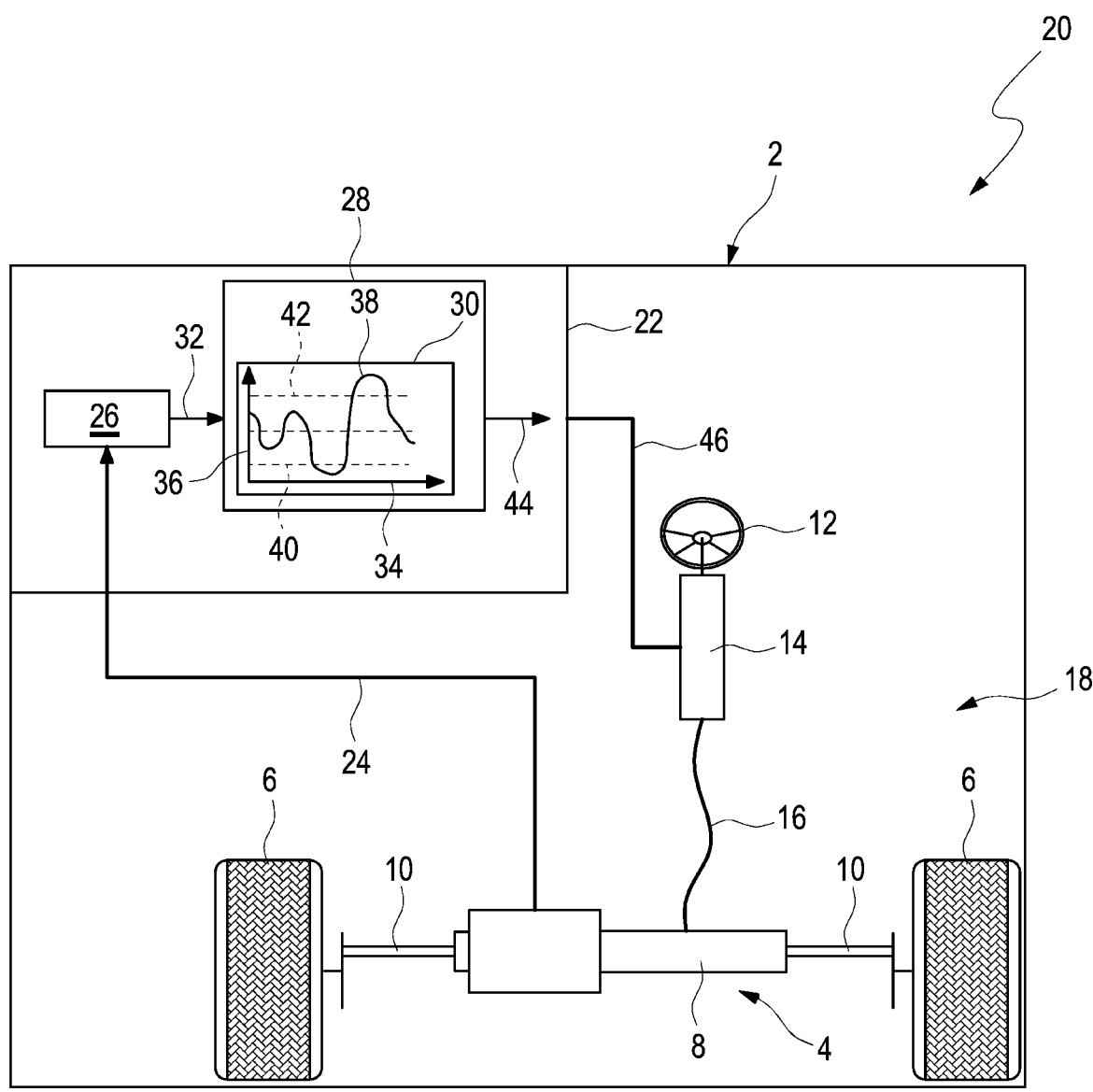

METHOD FOR STEERING A MOTOR VEHICLE

FIELD

The disclosure relates to a method for steering a motor vehicle and a system for steering a motor vehicle.

BACKGROUND

A steering mechanism for a motor vehicle is typically designed as a power steering mechanism with a mechanical connection between a steering wheel as an operating element and a steering actuator of a mechatronic steering system, for example a steering gear. In such a system, actuating forces acting on the operating element can be influenced by the steering actuator. In such a steering system and/or such a steering mechanism, safety goals are defined, according to which actuation forces that are either too low or too high are to be prevented. On account of the mechanical connection between the steering wheel and the steering gear, the safety goals are defined with respect to the steering actuator.

In a wire-based steering system or steer-by-wire system as a power steering system, a manual actuator sets an actuating force on the steering wheel according to a total tie rod force and other boundary conditions, for example, a steering wheel angle, a speed of the motor vehicle, etc.

Furthermore, the safety goals relating to the actuation forces remain applicable in steer-by-wire systems as well. If the steering actuator is still to be used for fulfilling said safety goals, the safety goals must also be applied, among other things, to total tie rod force detection since faulty detection can lead to manual forces on the steering wheel that are unacceptably high or low. Furthermore, the safety goals must be applied to the communication network between the steering actuator and the manual actuator, which can result in technical efforts and financial costs.

Publication DE 10 2009 048 092 A1 describes a control method for a steering system with electrical power assistance.

An electro-hydraulic steering system for a motor vehicle is known from publication DE 199 29 427 A1.

A hydraulic steering system for a mobile machine is described in publication DE 10 2011 106 276 A1.

SUMMARY

In the light of the above, it was an object to comply with safety goals and/or safety requirements for a steering mechanism.

The method according to the invention is provided for steering a motor vehicle by means of a steering mechanism, wherein the steering mechanism has an operating element that is manually operable or an actuating element that is manually actuable designed, for example, as a steering wheel, a manual actuator or manual control element, a steering actuator or steering control element, at least one transmission component, and a steering feel function. The steering actuator is connected to at least one steerable wheel of the motor vehicle via the at least one transmission component, wherein the actuating element and the manual actuator are mechanically connected to each another. According to the method, operating values of a total transmission force acting on the at least one transmission component are transmitted to the steering feel function, which is used to determine input values of a manual force for the manual actuator from the determined operating values for the entire transmission force. The input values are transmitted to a system function for limiting and/or checking the plausibility of the input values and are compared, by the system function, with a predefined or defined maximum value for the actuating force and a predefined or defined minimum value for the actuating force. Input values that are greater than the maximum value are reduced to at least the maximum value, i.e. they are capped to the maximum value, and input values that are lower or less than the minimum value are raised to at least the minimum value. From the input values controlled, for example, limited, by the system function, the system function determines output values for the manual force and predefines them with respect to the manual actuator in response to the operating values for the entire actuating force, wherein the actuating or operating element is moved, by the manual actuator, as a function of these output values for the manual force and a mechanical response or mechanical feedback is provided to a driver of the vehicle via a movement of the at least one wheel.

According to the definition, an input value and an output value resulting therefrom are thus set to be, on the one hand, at least as large as or not less than the minimum value or a lower limit and, on the other hand, at most as large as or not larger than the maximum value or an upper limit. Thus, the manual force is kept above the lower limit and below the upper limit.

The method is carried out for a steering mechanism in which the at least one transmission component is designed as at least one tie rod between the steering actuator and the at least one wheel, wherein a total tie rod force acting on the at least one tie rod is determined as the total transmission force. Typically, the actuating or operating element is designed as a steering wheel.

Usually, the steering actuator is associated with a steerable axle of the motor vehicle, which typically has two steerable wheels which can be steered synchronously or individually. Furthermore, the steering actuator is connected to each wheel via at least one respective transmission component, i.e. for example via at least one transmission component or a tire rod. Thus, one respective transmission force acts on at least one respective transmission component between each wheel and the steering actuator, from which in turn the total transmission force is determined. The steering actuator can be associated with at least one sensor which is designed to determine a respective transmission force and, thus, also the entire transmission force. However, as an alternative or in addition, it is also possible to derive a respective transmission force and thus the entire transmission force from at least one operating parameter of the steering actuator.

Furthermore, the method is carried out for a steering mechanism having a communication network which has at least one connection, for example a radio-based or wireless connection, or a physical or wired line, wherein the manual actuator and the steering actuator are connected via the communication network to exchange signals. Typically, the communication network is provided as the only connection between the manual actuator and the steering actuator. A mechanical connection via which forces could be transmitted is generally not provided here, which is why the method is provided for a steer-by-wire steering mechanism.

In one embodiment, the system function and the steering feel function are carried out in a software-assisted manner.

The system according to the invention is designed for steering a motor vehicle by means of a steering mechanism, wherein the steering mechanism has a steering wheel as a manual actuating element, an electromechanical manual actuator, an electromechanical steering actuator, at least one mechanical transmission component, and a steering function, wherein the steering actuator is connected to at least one steerable wheel of the motor vehicle via the at least one transmission component, wherein the actuating element and the manual actuator are mechanically connected to each other. This system has a system function for limiting and/or checking the plausibility of input values. According to the invention, the operating values of a total transmission force acting on the at least one transmission component, are transmitted or are to be transmitted and/or transmittable to the steering feel function, wherein the steering feel function is designed to determine input values of a manual force for the manual actuator from the determined operating values for the entire transmission force, wherein the input values are transmitted or are to be transmitted and/or transmittable to the system function for limiting and/or checking the plausibility of the input values. The system function is designed to compare the input values with a predefined or defined maximum value and a predefined or defined minimum value for the actuating force and reduce input values that are greater than the maximum value to at least the maximum value or an upper limit and increase input values which are less than or lower than the minimum value to at least the minimum value or a lower limit. The system function is also designed to determine output values for the manual force from the input values controlled, for example limited, by the system function and to predefine them with respect to the manual actuator, wherein the manual actuator is designed to move the actuating element as a function of these output values for the manual force, which can be felt manually by the driver.

The system has a control unit implementing the system function, wherein the control unit is designed to perform or execute the system function. In one embodiment, the steering feel function is implemented in the control device, wherein the control device is designed to perform the steering feel function as well.

An embodiment of the method presented and/or an embodiment of the system presented enables to provide a software architecture with regard to functional safety and/or for functional safety of the steering mechanism for a wire-bound steering system or a steer-by-wire system or a corresponding steering mechanism by providing the system function, wherein this software architecture prevents unsafe manual forces or steering forces on the steering wheel of the steering mechanism.

Implementing an embodiment of the method with an embodiment of the system enables to apply safety goals relating to the manual force as the actuating force or operating force to the manual actuator. The function architecture of the system function is proposed to fulfil the safety goals. Said function architecture enables use of the system function for limiting the input values to the output values and/or checking the plausibility of the input values at the end of a rule chain, wherein the system function is designed to evaluate the defined and/or predefined input values for the manual force with respect to possible non-compliance with the safety goals. If the safety goals are exceeded, an operating parameter, in one embodiment the actuating force, is limited to a maximum possible value or the maximum value or an upper limit. If the safety goals and/or the actuating force usually acting on the steering wheel fall below the permissible values, corresponding action is also taken and the manual force or the actuating force is kept above a lower limit and thus above a minimum possible value or minimum value.

The steering mechanism for a motor vehicle is designed as a power steering mechanism with an electrical connection, for example a line or a radio-based connection, for exchanging signals between the steering wheel as an actuating or operating element and the steering actuator or steering control element of the mechatronic steering system, which typically has a steering gear. It is possible that manual forces as actuation forces imparted by the manual force actuator or manual force control element which applies forces to the steering wheel as an operating element, wherein the manual forces acting on the operating element are influenced by the steering actuator. In such a steering mechanism or steering system, safety goals are provided, according to which actuation forces which are either too low or too high are to be avoided, which is possible with the method and system. The safety goals are set or defined by the system function.

In a wire-bound steering system or a steer-by-wire system as a power steering system, signals are communicatively transmitted between the steering actuator and the actuating or operating element, wherein there is no mechanical connection between the steering actuator and the actuating or operating element for transmitting forces. To be able to set the actuating force on the actuating element, the manual actuator is associated with the actuating element. The steering actuator and the manual actuator are connected to each another via the communication network in a wired or wireless manner, for example by radio. For example, the total tie rod force detected by the steering actuator is communicated to the control unit as the total transmission force via this communication network and, after having been processed in accordance with an embodiment of this method, communicated to the manual actuator. The manual actuator sets the manual force on the steering wheel as an actuating force that can be felt and/or perceived manually by the driver due to a movement of the actuating element, which is usually designed as a steering wheel.

This enables the safety goals regarding the actuation forces to be ensured for the steer-by-wire system as well. This prevents manual forces that are unacceptably high or low on the steering wheel.

Amongst others safety goals or safety requirements relating to the steering actuator and the communication network can thus be reduced, which reduces the cost and complexity of the steering mechanism.

It will be appreciated that the features mentioned above and those to be explained below may not only be used in the combination specified in each case, but also in other combinations or on their own without departing from the scope of the present invention.

BRIEF DESCRIPTION OF THE FIGURE(S)

The invention is illustrated schematically in the drawing using embodiments and is described schematically and in detail with reference to the drawing.

FIG. 1 shows a schematic representation of an embodiment of the system according to the invention for implementing an embodiment of the method according to the invention.

DETAILED DESCRIPTION

FIG. 1 shows a schematic representation of a motor vehicle 2, of which a steerable axle 4 associated with wheels 6 is shown here. A steering actuator 8 or steering control element is connected to each wheel 6 via a respective tie rod 10 as a transmission component. FIG. 1 also shows a steering wheel 12 as an actuating element for a driver of the motor vehicle 2 which is connected to a manual actuator 14 or manual control element. Furthermore, the steering actuator 8 and the manual actuator 14 are connected to each other via at least one line 16 as a connection of a communication network. According to the invention, the steering actuator 8, the tie rods 10, the steering wheel 12, the manual actuator 14 and also the line 16 are designed as components of a wire-based steering mechanism 18 of the motor vehicle 2 herein.

The embodiment of the system 20 according to the invention comprises a control unit 22 and an additional line 24 as a connection via which the control unit 22 is connected to the steering actuator 8. Further, at least one of the components of the steering system 18 presented above may also be designed as part of the system 20.

According to the invention, a steering feel function 26 and a system function 28 are implemented in the control unit 22, wherein a map 30 for values, here for input values 32 and output values 44, of a manual force or steering force is implemented in the system function 28. This system function 28 is designed for limiting input values 32 and/or for checking the plausibility of the input values 32.

When the steering mechanism 18 is in operation, operating values of a total tie rod force are determined as the total transmission force between the steering actuator 8 and the wheels 6 and transmitted by the steering actuator 8 to the steering feel function 26 via the additional line 24 and thus also to the control unit 22. According to the invention, the steering feel function 26 determines, for example calculates, input values 32 for the manual force from the determined operating values for the total tie rod force, wherein each input value 32 according to the steering feel function 26 is dependent on the detected, for example measured by a sensor, operating value of the total tie rod force as the total transmission force. The input values 32 continue to be transmitted to the system function 28 in the control unit 22.

The map 30 for the system function 28 comprises an abscissa 34 herein, along which time is plotted, and an ordinate 36, along which the input values 32 for the manual force are applied. Since a multitude of operating values of the total tie rod force is determined during the operation of the steering mechanism 18 and input values 32 for the manual force are in turn determined therefrom by means of the steering feel function 26, a corresponding curve 38 for a temporal progression of the input values 32 is derived.

In the presented embodiment of the method according to the invention, the system function 28 is used. It is taken into account that a minimum value 40 and a maximum value 42 is predefined and/or defined for output values 44 of the manual force in the map. In the embodiment of the method, the input values 32 for the manual force are limited or bounded taking into account the minimum value 40 and the maximum value 42. Using system function 28, output values 44 are provided from the original input values 32, wherein a maximum output value 44 is at most as large as or not larger than the maximum value 42 and a minimum output value 44 is at least as large as or not less than the minimum value 40.

In a variant of the method, a respective input value 32 which is greater than the intended maximum value 42 can be limited to the maximum value 42. Furthermore, an input value 32 that is less than the minimum value 40 is increased to the minimum value 40. An input value 32 which is at least as large as the minimum value 40 and at most as large as the maximum value 42 is transmitted immediately and unchanged to an output value 44 by means of the system function 28. Thus, the output values 44 for the manual force are at least as large as the minimum value 40 and at most as large as the maximum value 42. The output values 44 are in turn transmitted by the control unit 22 via an additional line 46 as a connection to the manual actuator 14. Based on these limited output values 44 a force is applied to the hand actuator 14 and, thus, a force is applied to the steering wheel 12 as feedback of the total tie rod force as the total transmission force for the driver of the vehicle 2.

REFERENCE NUMERALS

2 Motor vehicle
4 Axle
6 Wheel
8 Steering actuator
10 Tie rod
12 Steering wheel
14 Manual actuator
16 Line
18 Steering mechanism
20 System
22 Control unit
24 Line
26 Steering feel function
28 System function
30 Map
32 Input value
34 Abscissa
36 Ordinate
38 Curve
40 Minimum value
42 Maximum value
44 Output value
46 Line

The invention claimed is:

1. A method for steering a motor vehicle by a steering mechanism, wherein the steering mechanism has an actuating element, a manual actuator, a plurality of steering actuators, a plurality of transmission components, and a steering feel function, wherein each steering actuator is connected to a steerable wheel of the motor vehicle via a transmission component, wherein the actuating element and the manual actuator are mechanically connected to each other, wherein operating values of a total transmission force acting on the at least one transmission component are transmitted to the steering feel function, which is used to determine input values of a manual force for the manual actuator from the determined operating values for the entire transmission force, wherein the input values are transmitted to a system function for limiting the input values and compared to a predefined maximum value and a predefined minimum value for the actuating force by the system function, wherein input values which are greater than the maximum value are reduced to at least the maximum value and input values which are less than the minimum value are increased to at least the minimum value, wherein the system function determines output values for the manual force from the input values and defines them with respect to the manual actuator, wherein the manual actuator moves the actuating element as a function of these output values for the manual force;

wherein the plurality of transmission components comprise a plurality of tie rods between a steering actuator in the plurality of steering actuators and the steerable wheel to which the steering actuator is connected, wherein a total tie rod force acting on the plurality of tie rods is determined as the total transmission force, wherein the steering mechanism further comprises a sensor configured to detect the total tie rod force between the steering actuator and the at least one wheel; and wherein the system function for limiting the input values comprises a function of: plotting the input values, as a plurality of total tie rod force values, over a period of time, constructing a curve for a temporal progression of the input values, determining whether to compare the curve to a predetermined limit or a user-determined limit, and comparing the curve to the predetermined limit or the user-determined limit.

2. The method according to claim 1 carried out for a steering mechanism which has a communication network having at least one connection, wherein the manual actuator and the steering actuator are connected to each another via the communication network to exchange signals.

3. The method according to claim 1 in which the system function is carried out in a software-assisted manner.

4. A system for steering a motor vehicle by a steering mechanism, wherein the steering mechanism has an actuating element, a manual actuator, a plurality of steering actuators, a plurality of transmission components, and a steering feel function, wherein each steering actuator is connected to a steerable wheel of the motor vehicle via a transmission component, wherein the actuating element and the manual actuator are mechanically connected to each other, wherein the system has a system function for limiting input values, wherein operating values of a total transmission force acting on the at least one transmission component are to be transmitted to the steering feel function, wherein the steering feel function is designed to determine input values of a manual force for the manual actuator from the determined operating values for the entire transmission force and to transmit the input values to the system function, wherein the system function is designed to compare the input values to a predefined maximum value and a predefined minimum value for the actuating force and to reduce input values which are greater than the maximum value to at least the maximum value and increase input values which are less than the minimum value to at least the minimum value, wherein the system function is designed to determine output values for the manual force from the input values and define them with respect to the manual actuator, wherein the manual actuator is designed to move the actuating element as a function of these output values for the manual force;

wherein the plurality of transmission components comprise a plurality of tie rods between a steering actuator in the plurality of steering actuators and the steerable wheel to which the steering actuator is connected, wherein a total tie rod force acting on the plurality of tie rods is determined as the total transmission force, wherein the steering mechanism further comprises a sensor configured to detect the total tie rod force between the steering actuator and the at least one wheel; and wherein the system function for limiting the input values comprises a function of: plotting the input values, as a plurality of total tie rod force values, over a period of time, constructing a curve for a temporal progression of the input values, determining whether to compare the curve to a predetermined limit or a user-determined limit, and comparing the curve to the predetermined limit or the user-determined limit.

5. The system according to claim 4 having a control unit in which the system function is implemented, wherein the control unit is designed to carry out the system function.

6. The method according to claim 1 in which the system function is carried out in a software-assisted manner.

7. The method according to claim 2 in which the system function is carried out in a software-assisted manner.

* * * * *